(No Model.)

F. E. ALLEN.
CAR STARTER.

No. 264,119. Patented Sept. 12, 1882.

WITNESSES.
D. L. Miller.
O. R. Barton.

INVENTOR
Frederick E. Allen
By Chas. H. Burleigh,
Atty

UNITED STATES PATENT OFFICE.

FREDERICK E. ALLEN, OF GRAFTON, MASSACHUSETTS.

CAR-STARTER.

SPECIFICATION forming part of Letters Patent No. 264,119, dated September 12, 1882.

Application filed April 27, 1882. (No model.)

*To all whom it may concern:*

Be it known that I, FREDERICK E. ALLEN, of Grafton, in the county of Worcester and State of Massachusetts, have invented certain new and useful Improvements in Car-Starters; and I declare the following to be a description of my said invention sufficiently full, clear, and exact to enable others skilled in the art to which it appertains to make and use the same, reference being had to the accompanying drawings, which form a part of this specification.

My present invention relates to certain improvements in car-starting mechanism of that class wherein a part of the force exerted by the stopping of the car is stored up and utilized to assist in again starting the car; and my invention consists in a mechanism constructed and organized for operation, as herein illustrated and described.

Figure 1:
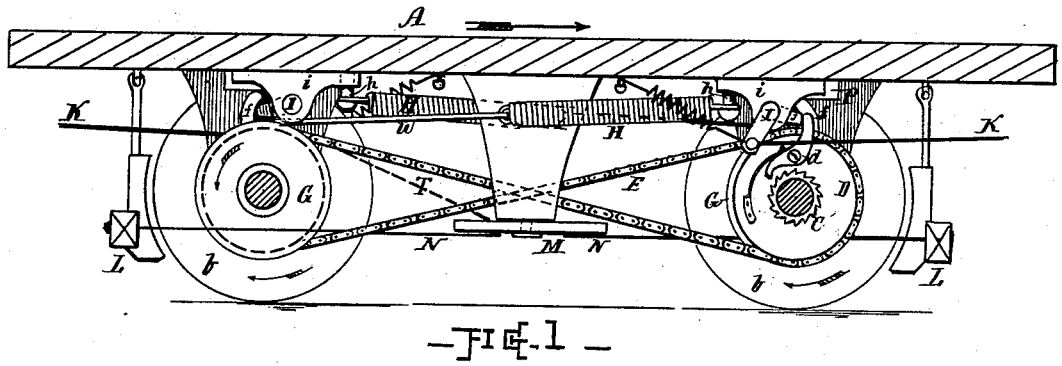
Figure 2:
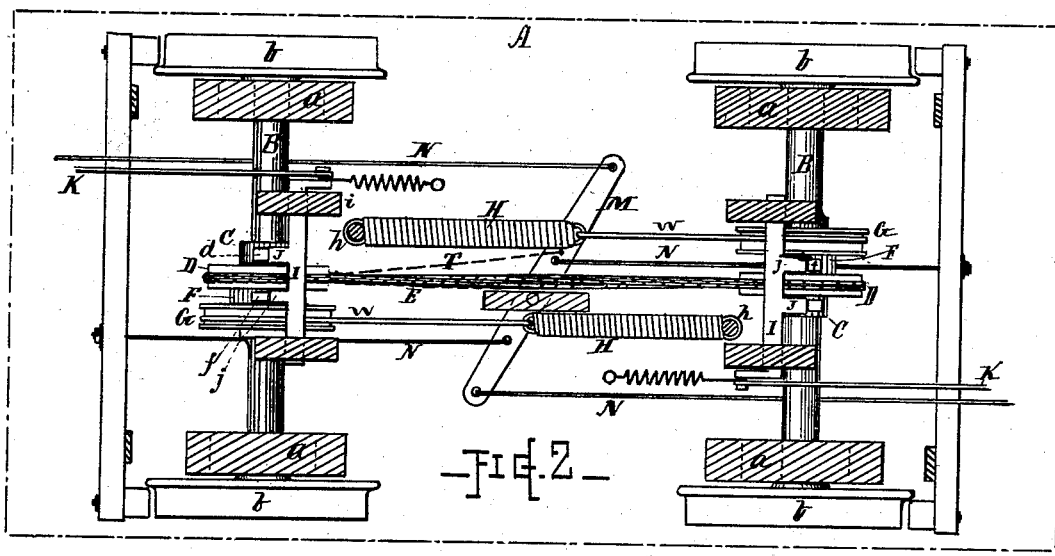
Figure 3:
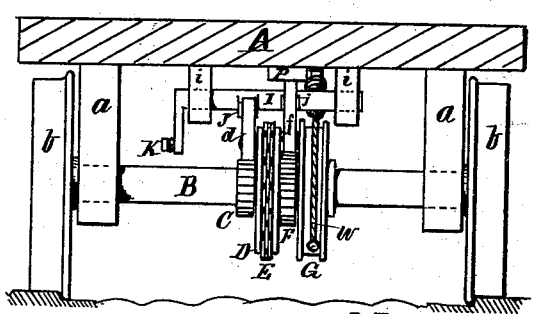
Figure 4:
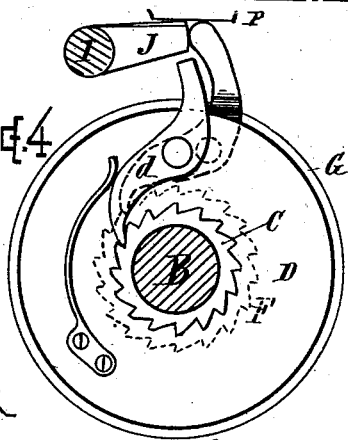

In the drawings, Figure 1 is a side view of my improved car-starting mechanism as applied to an ordinary street-car. Fig. 2 is a top plan view of the same, the parts which connect to the body of the car being shown in section, and the position of the car being indicated by dotted and broken lines. Fig. 3 is a front view, and Fig. 4 is a view of one of the ratchet devices on a somewhat larger scale.

In reference to the drawings, A denotes the body of the car; $a$, the journal supports or bearings; B, the axles; and $b$ the track-wheels.

C C indicate ratchet-wheels rigidly fixed to the respective axles, with their teeth inclined toward the right and left respectively, according as the axles are located in relation to the respective ends of the car, one of said ratchets operating the mechanism when the car is moving in one direction and the other when the car is moving in opposite direction. In like manner the several devices connected with the respective axles B, while being of similar construction and combined for joint action, are respectively arranged in right-and-left order, so as to be actuated from the forward end of the car irrespective of which end may, for the time being, be in the forward direction.

D D indicate sprocket wheels or pulleys, mounted upon the respective axles B, adjacent to the ratchets C, and arranged to turn loose on said axles. Said wheels D are connected to each other by a drive chain or band, E, crossed in the manner indicated, whereby both of said wheels or pulleys are caused to turn in unison, but in opposite directions.

$d\ d$ indicate pawls pivoted on the sides of the sprocket-wheels D, for engagement with the ratchets C on the axles, whereby motion is imparted to said sprocket-wheels.

F F indicate ratchet-wheels rigidly fixed on the sides of the sprocket-wheels D.

G G indicate winding drums or wheels loose on the axles B, and provided with pawls $f$, which engage with the ratchets F of the wheels D.

H H indicate springs, one end of which is secured to the car-body A by a suitable stud or connection, $h$, while their other ends are attached by chains, straps, or cords to the peripheries of the winding-drums G, respectively.

I I indicate rocker-shafts mounted in bearings $i$ on the car-body A, above the axles B, and provided with lugs or projecting arms J $j$, that engage the upward extended shanks of the pawls $d$ and $f$, for forcing their points out from the ratchets of the wheels F and C. Said rocker-shafts I are provided with cranked arms at their ends, from which rods or connections K extend to the ends of the car, and by means of which the shafts I can be operated for raising the lugs J and releasing the pawls $d$ and $f$. Suitable springs are provided for throwing down the points of the pawls to cause them to engage the ratchet when released by the lugs J.

L indicates the brakes, M the brake-actuating lever, and N N the links or rods connecting the brake-bars L to the lever M and said lever with the spindle at the ends of the car A, by means of which the brake mechanism is operated.

The operating-rods K of the starter mechanism can, if desired, be connected with the brake-links N, so that the operation of setting the brake will also set the starter mechanism, or the starter can be set by an independent-acting device, any mechanism adapted to give a pull on the rod K being sufficient for the purpose.

P indicates a plate or lug for the arrest of the arm $j$ when the rocker I swings upward.

R R indicate springs for drawing back the rockers I when the strain on the pulls K is released.

The operation is as follows: The car traveling in the direction indicated by arrow, the forward axle would be that on the right of the drawings, and for the purpose of this description it is so considered. For setting the starter into action, the driver, by means of the rod K or devices in connection therewith, rocks the forward shaft I so as to raise the lug J from the tail of the pawl $d$, which pawl immediately drops into the ratchet C, thereby connecting the forward sprocket-wheel D with the revolving axle B, causing said wheel to revolve with the chain E, and thereby rotating the wheel D upon the rear axle. This latter wheel, in connection with the ratchet F and pawl $f$, effects the simultaneous rotation of the rear winding-drum G, causing it to wind up the chain $w$ and stretch out the spring H, at the same time carrying the pawl $d$ around the rear axle and away from the lug J, so that it will engage the ratchet C whenever it is released by the stopping of the car, or by a change in direction of motion of the wheel D, thus transferring the strain of the spring H, which has accumulated by the draft of the ratchet C on the forward axle, while stopping the car, back onto the ratchet C of the rear axle, as so much power acting to propel the car forward the instant the brake is released from the wheels $b$. When the car starts forward the winding-drums and sprocket-wheels turn back to their former positions, and the hooked end of the pawl $d$ engages with the lug or arm J of the rocker-shaft I, thereby swinging the pawl out of working position or engagement with the teeth of the ratchet C, where it remains until the shaft I is again actuated. The pawl $f$ is thrown out from its ratchet F by the same movement of shaft I which throws the pawl $d$ into action, and vice versa.

If desired, the brake-lever M and chain E may be connected by suitable link device at T, so that the winding up of the starter will apply the brake when it has reached a given degree of tension. This, however, is not essential in all cases.

What I claim as of my invention, and desire to secure by Letters Patent, is—

The combination of the car-axles B, having ratchets C, the sprocket-wheels or pulleys D, provided with pawls $d$ and ratchets F, the chain or band E, connecting said wheels, the winding-drums G, having pawls $f$, the springs H, and the rocker-shaft I, with mechanism for throwing said devices into and out of action, substantially as and for the purpose set forth.

Witness my hand this 22d day of April, A. D. 1882.

FREDERICK E. ALLEN.

Witnesses:
   CHAS. H. BURLEIGH,
   GEO. M. RICHARDSON.